United States Patent
Fulzele et al.

(10) Patent No.: US 10,484,940 B1
(45) Date of Patent: Nov. 19, 2019

(54) NETWORK ASSOCIATION BASED ON NETWORK PERFORMANCE CAPABILITIES

(71) Applicant: Motorola Mobility LLC, Chicago, IL (US)

(72) Inventors: Dipti Dipak Fulzele, Bangalore (IN); Rajesh Kumar Subramanian, Sarjapur (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/418,226

(22) Filed: May 21, 2019

(51) Int. Cl.
| | |
|---|---|
| H04W 4/00 | (2018.01) |
| H04W 48/18 | (2009.01) |
| H04W 8/18 | (2009.01) |
| H04W 48/16 | (2009.01) |
| H04W 4/60 | (2018.01) |
| H04W 88/06 | (2009.01) |
| H04W 76/15 | (2018.01) |
| H04W 24/02 | (2009.01) |
| H04W 72/04 | (2009.01) |

(52) U.S. Cl.
CPC .......... H04W 48/18 (2013.01); H04W 4/60 (2018.02); H04W 8/183 (2013.01); H04W 24/02 (2013.01); H04W 48/16 (2013.01); H04W 72/048 (2013.01); H04W 76/15 (2018.02); H04W 88/06 (2013.01)

(58) Field of Classification Search
CPC ....... H04W 48/18; H04W 4/60; H04W 76/15; H04W 8/183; H04W 24/02; H04W 48/16; H04W 72/048; H04W 88/06

USPC ...................................................... 455/435.2
See application file for complete search history.

(56) References Cited

U.S. PATENT DOCUMENTS

| | | | | |
|---|---|---|---|---|
| 2012/0190362 | A1* | 7/2012 | Subbarayudu | H04W 76/28 455/435.1 |
| 2013/0109436 | A1* | 5/2013 | Tat | H04W 8/183 455/558 |

(Continued)

OTHER PUBLICATIONS

Bari,"Automated Network Selection in a Heterogeneous Wireless Network Environment", Feb. 2007, pp. 34-40.

(Continued)

*Primary Examiner* — Charles T Shedrick
(74) *Attorney, Agent, or Firm* — SBMC

(57) ABSTRACT

In aspects of network association based on network performance capabilities, a device includes a first subscriber identity module (SIM) to enable a first subscription for data communication between the device and data communication networks, and includes a second SIM to enable a second subscription for additional data communication between the device and the data communication networks. The device implements a network manager to determine network data parameters that indicate performance capabilities of the data communication networks. The network manager can associate a first application of the device with a first network of the data communication networks that has a greater performance capability for a data streaming download based on the network data parameters. The network manager can also associate a second application of the device with a second network of the data communication networks for an interactive session of intermittent data communications based on the network data parameters.

20 Claims, 5 Drawing Sheets

(56) References Cited

U.S. PATENT DOCUMENTS

| | | | |
|---|---|---|---|
| 2016/0044178 A1* | 2/2016 | Narayanaswamy | H04M 3/54 455/558 |
| 2016/0057661 A1* | 2/2016 | Nayak | H04W 36/0022 370/331 |
| 2016/0205605 A1* | 7/2016 | Krishnamurthy | H04W 36/20 455/553.1 |
| 2016/0366615 A1* | 12/2016 | Batchu | H04L 47/14 |
| 2018/0220329 A1* | 8/2018 | Arumugam | H04W 12/06 |
| 2018/0249349 A1* | 8/2018 | Hu | H04W 24/02 |
| 2018/0255486 A1* | 9/2018 | Kumar | H04L 45/125 |
| 2018/0331705 A1* | 11/2018 | Ghani | H04L 1/1812 |
| 2018/0332428 A1* | 11/2018 | Gupta | H04L 61/1564 |

OTHER PUBLICATIONS

Gelenbe,"Self-Aware Networks and QoS", Sep. 2004, pp. 1478-1489.

Sehgal,"QoS Based Network Selection Scheme for 4G Systems", May 2010, pp. 560-565.

Song,"Network Selection in an Integrated Wireless LAN and UMTS Environment Using Mathematical Modeling and Computing Techniques", Jun. 2008, pp. 42-48.

\* cited by examiner

NETWORK ASSOCIATION BASED ON NETWORK PERFORMANCE CAPABILITIES

BACKGROUND

Devices such as smart devices, Internet of Things (IoT) devices, wireless access points, mobile devices (e.g., cellular phones, tablet devices), consumer electronics, and the like can be implemented for use in a wide range of industries and may use various networking technologies and protocols to communicate with other devices, servers, and/or cloud systems. Any number of these devices may be implemented for cellular network communication via a cellular network, using any of the various generations of cellular wireless technology. Additionally, any number of the devices may be implemented as dual-SIM devices for dual-data connectivity also commonly referred to as dual-VoLTE (Voice over Long-Term Evolution), which is a standard based on the IP Multimedia Subsystem (IMS) network for high-speed wireless communication implemented for mobile phones and data terminals, including for Internet-of-Things (IoT) devices and wearable devices.

A dual-SIM mobile device that supports LTE on two subscriptions will have Internet PDN (packet data network) established as part of the LTE registration. Although both of the LTE subscriptions will have the Internet PDN active, only the subscription associated with having data enabled (e.g., by Application DDS (data distribution service)) will be able to utilize the established Internet PDN. For the other subscription (e.g., the non-DDS), the Internet PDN will be established, but is not usable for data communication by the device. Typically in a dual-SIM device, only one of the two LTE subscriptions is enabled and active for data communication. Although either of the two subscriptions can be selected for network connectivity and data communication, user intervention in the form of a device input is needed to switch between the two subscriptions for network connectivity. If a poor network connection is encountered during a data transfer, the user has to manually select one or the other of the subscriptions to complete the data transfer, which is slow, time-consuming, and not a favorable user experience of the dual-SIM device.

BRIEF DESCRIPTION OF THE DRAWINGS

Implementations of network association based on network performance capabilities are described with reference to the following Figures. The same numbers may be used throughout to reference like features and components shown in the Figures.

DETAILED DESCRIPTION

Figure 1:
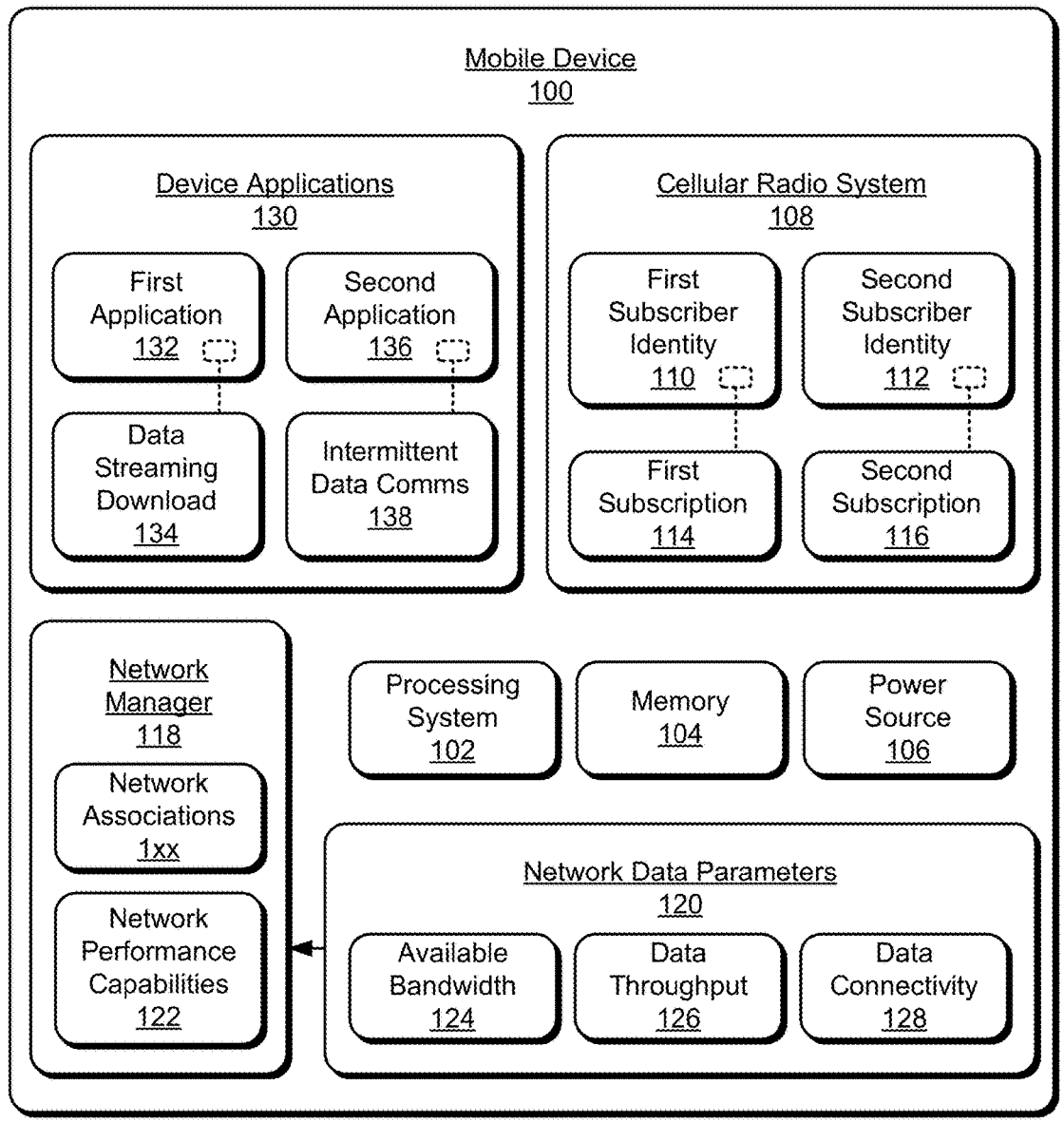
FIG. 1 illustrates an example device that can be used to implement techniques of network association based on network performance capabilities as described herein.

Implementations of network association based on network performance capabilities are described, and provide techniques to determine network performance capabilities and automatically associate the LTE subscriptions in a dual-SIM device with data communication networks that provide the performance capabilities for device applications initiating data communications in the dual-SIM device. This effectively associates the data communications from device applications with data networks based on network performance for dual-SIM devices. Notably, this improves the user experience when using a dual-SIM device because the user no longer has to manually select one or the other of the two LTE subscriptions to complete a data transfer if a poor network connection is encountered during the data transfer.

In aspects described herein, a mobile device, such as a mobile phone or smart phone, includes a cellular radio system for cellular network connection to data communication networks. The mobile device is a dual-SIM device that includes a first subscriber identity and a second subscriber identity, each of which may be implemented as a subscriber identity module (SIM or commonly referred to as a SIM card) or as an embedded SIM (eSIM) designed to securely store the international mobile subscriber identity (IMSI) number and related security key for the mobile device, and which are used to identify and authenticate the device as a subscriber on the cellular network. The first subscriber identity enables a first subscription for data communication between the mobile device and data communication networks associated with a cellular network operator. Similarly, the second subscriber identity enables a second subscription for additional data communication between the mobile device and the data communication networks. Notably, both of the subscriptions can be actively used for network data communications, and may be based on device application requirements for data exchange.

In aspects of the techniques described herein, the mobile device implements a network manager that is implemented to determine the network data parameters that indicate network performance capabilities of the data communication networks of the wireless network operator associated with the first and second subscriptions for the dual-SIM device. The network data parameters that indicate the network performance capabilities of the data communication networks can include at least available bandwidth, data throughput (e.g., network data speed), and data connectivity (e.g., network connection stability). The mobile device also includes device applications (e.g., software applications), which may be any type of data-centric applications. Generally, some of the device applications will be data-intensive, such as a media playback application for data streaming a movie for playback on the mobile device that will utilize available bandwidth and require network connection stability. Other device applications will only utilize intermittent data communications, such as for an interactive messaging session that does not require a great deal of bandwidth and only a minimal amount of data throughput.

The network manager of the mobile device is implemented to associate a first device application with a first network that has a greater performance capability for a data streaming download based on the network data parameters. For example, the first device application may initiate video streaming for video playback on the mobile device, which is data-intensive, and the network manager can determine that the first network has more available bandwidth for the data streaming download than a different one of the data communication networks. Similarly, the network manager can also associate a second device application with a different, second network that is more reliable for intermittent data communications based on the network data parameters. For example, the second device application may initiate an interactive session that includes message exchanges intermittently communicated and received, and the network manager can determine that the second network has a more reliable data connectivity for the message exchanges of the interactive session than a different one of the data communication networks.

While features and concepts of network association based on network performance capabilities can be implemented in any number of different devices, systems, networks, environments, and/or configurations, implementations of network association based on network performance capabilities are described in the context of the following example devices, systems, and methods.

FIG. 1 illustrates an example mobile device 100 that can be used to implement techniques of network association based on network performance capabilities, as described herein. In this example, the mobile device 100 may be any type of a mobile phone, smart phone, tablet device, and the like. Generally, the mobile device 100 is any type of an electronic and/or computing device implemented with various components, such as a processing system 102 and memory 104, as well as any number and combination of different components as further described with reference to the example device shown in FIG. 5. For example, the mobile device 100 can include a power source 106 to power the device, such as a rechargeable battery and/or any other type of active or passive power source that may be implemented in an electronic and/or computing device.

In this example, the mobile device 100 is a dual-SIM device with a cellular radio system 108 that includes a first subscriber identity 110 and a second subscriber identity 112. Each of the first subscriber identity 110 and the second subscriber identity 112 may be implemented as a subscriber identity module (SIM or commonly referred to as a SIM card) or as an embedded SIM (eSIM) designed to securely store the international mobile subscriber identity (IMSI) number and related security key for the mobile device, and which are used to identify and authenticate the device as a subscriber on a cellular network. The dual-SIM mobile device 100 enables dual-data connectivity for an overall better user experience using mobile devices. This is also commonly referred to as dual-VoLTE (Voice over Long-Term Evolution), which is a standard based on the IP Multimedia Subsystem (IMS) network for high-speed wireless communication implemented for mobile phones and data terminals, including for Internet-of-Things (IoT) devices and wearable devices.

The first subscriber identity 110 (e.g., implemented as a SIM card or as an eSIM) enables a first subscription 114 for data communication between the mobile device 100 and data communication networks associated with a cellular network operator. Similarly, the second subscriber identity 112 (e.g., implemented as a SIM card or as an eSIM) enables a second subscription for additional data communication between the mobile device 100 and the data communication networks. In implementations, the mobile device 100 supports LTE on both of the first and second subscriptions 114, 116 and has Internet PDN (packet data network) established and active as part of LTE registration for wireless broadband communication. Notably, both of the subscriptions 114, 116 can be actively used for network data communications, and may be based on device application requirements for data exchange.

Generally, the mobile device 100 implements the cellular radio system 108 with a radio device, antenna, and chipset implemented for cellular network communication with other devices, networks, and services utilizing any suitable communication protocol or standard for cellular wireless communication. The cellular radio system 108 may also be implemented with multiple transceivers to maintain both network connections associated with the first subscriber identity 110 and the second subscriber identity 112. The mobile device 100 may also be implemented for communication via a network (e.g., WLAN) or via a direct peer-to-peer connection (e.g., Wi-Fi Direct, Bluetooth™, Bluetooth LE (BLE), RFID, etc.).

Although not shown specifically, the mobile device 100 can include communication interfaces that facilitate network communications, as well as additional wireless radios that facilitate wireless communications, such as for Mobile Broadband, LTE, Near Field Communication (NFC), Real-time Locating System (RTLS), or any other wireless radio system or format for communication via respective wireless networks. The mobile device 100 can be implemented for data communication between devices and network systems, which may include wired and/or wireless networks implemented using any type of network topology and/or communication protocol, to include IP based networks, and/or the Internet, as well as networks that are managed by mobile network operators, such as a communication service providers, mobile phone providers, and/or Internet service providers.

The mobile device 100 includes a network manager 118 that implements features of network association based on network performance capabilities, as described herein. The network manager 118 may be implemented as a device module that includes independent processing, memory, and logic components functioning as a computing and/or electronic device integrated with the mobile device 100. Alternatively or in addition, the network manager 118 can be implemented as a software application or software module, such as computer-executable software instructions that are executable with a processor (e.g., with the processing system 102) of the mobile device 100. As a software application, the network manager 118 can be stored on computer-readable storage memory (e.g., the device memory 104), or any other suitable memory device or electronic data storage implemented with the network manager 118.

In aspects of network association based on network performance capabilities, the network manager 118 is implemented to determine network data parameters 120 that indicate network performance capabilities 122 of the data communication networks of the wireless network operator associated with the first and second subscriptions 114, 116. In this example, the network data parameters 120 that indicate the network performance capabilities 122 of the data communication networks include available bandwidth 124, data throughput 126 (e.g., network data speed), and data connectivity 128 (e.g., network connection stability).

The mobile device 100 also includes device applications 130 (e.g., software applications), which may be any type of data-centric applications that may be downloaded and executed on a mobile device. For example, the device applications 130 may include browser applications, messaging applications (e.g., to include text, phone, video chat, video clips, etc.), photo and video capture and editing applications, video and video clip playback applications, media playback applications, mapping applications, calendar applications, gaming applications, and/or any number of the thousands of possible device application types. Generally, some of the device applications 130 will be data-intensive, such as a media playback application for data streaming a movie for playback on the mobile device that will utilize available bandwidth and require network connection stability. Other device applications 130 will only utilize intermittent data communications (e.g., short-term data use), such as for an interactive messaging session that does not require a great deal of bandwidth and only a minimal amount of data throughput.

In aspects of the described techniques, the network manager 118 can associate a first application 132 (of the device applications 130) with one of the data communication networks (e.g., a first network) that has a greater performance capability for a data streaming download 134 based on the network data parameters 120. For example, the data streaming download 134 for the first application 132 is data-intensive, such as video streaming for video playback on the mobile device 100, and the network manager 118 can determine that the network data parameters 120 indicate the first network has more available bandwidth 124 for the data streaming download than a second one of the data communication networks.

The network manager 118 can also associate a second application 136 (of the device applications 130) with a different one of the data communication networks (e.g., a second network) that is more reliable for intermittent data communications 138 based on the network data parameters 120. For example, the intermittent data communications 138 for the second application 136 may be for an interactive session that includes message exchanges intermittently communicated and received, and the network data parameters 120 indicate the second network has a more reliable data connectivity 128 for the message exchanges than the first network.

In other aspects of the described techniques, the network manager 118 of the mobile device 100 is implemented to monitor the network data parameters 120 for updated performance capabilities of the data communication networks. In an event that the network performance capabilities 122 of the data communication networks change, as noted by monitoring the network data parameters 120, the network manager 118 of the mobile device can switch the application and network associations. For example, the network manager 118 may associate the first application 132 with the second network that now has more available bandwidth 124 for the data streaming download 134 than the first network based on a determination of updated network data parameters. Similarly, the network manager 118 may associate the second application 136 with the first network that has a more reliable data connectivity 128 for the intermittent data communications 138 of the interactive session than the second network based on a determination of the updated network data parameters.

Figure 2:
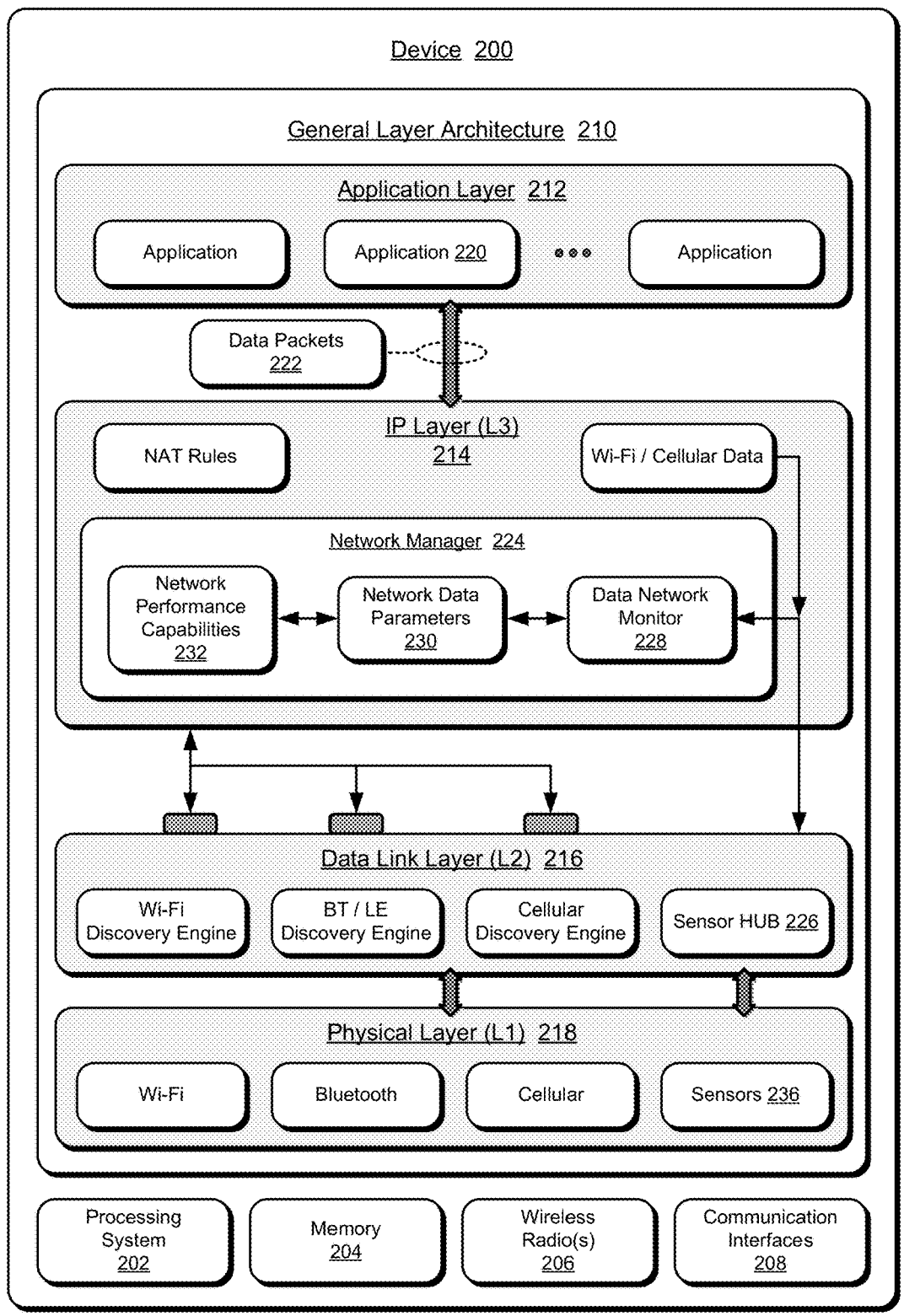
FIG. 2 further illustrates an example device that can be used to implement techniques of network association based on network performance capabilities as described herein.

FIG. 2 illustrates an example of a device 200 in which techniques of network association based on network performance capabilities can be implemented, as described herein. In this example, the device 200 is representative of any type of a computing device, the mobile device 100 (e.g., mobile phone or tablet), Internet of Things (IoT) device, wireless device, access point, node device, and/or electronic device implemented for network and/or wireless communication. The device 200 may also be configured as a wearable device that is designed to be worn by, attached to, carried by, or otherwise transported by a user, such as any type of glasses, a smart band or watch, media playback device, and fitness device. Other examples of wearable devices include, but are not limited to, badges, a key fob, an access card, and a ring, an article of clothing, a glove, or a bracelet, to name a few examples. Generally, the device 200 can be implemented with various components, such as a processing system 202 and memory 204, as well as any number and combination of different components as further described with reference to the example device shown in FIG. 5.

Various devices can communicate with each other via a network (e.g., WLAN) or via a direct peer-to-peer connection (e.g., Wi-Fi Direct, Bluetooth™, Bluetooth LE (BLE), RFID, etc.). The device 200 can include wireless radios 206 that facilitate wireless communications, as well as communication interfaces 208 that facilitate network communications. The device 200 can be implemented for data communication between devices and network systems, which may include wired and/or wireless networks implemented using any type of network topology and/or communication protocol, to include IP based networks, and/or the Internet, as well as networks that are managed by mobile network operators, such as a communication service providers, mobile phone providers, and/or Internet service providers.

In this example, operational aspects of the device 200 are represented with a general layer architecture 210, which is generally representative of an Internet Protocol Suite (TCP/IP four-layer model), or an Open System Interconnection Model (OSI seven-layer model), that characterizes the communication and networking functions in the device. This general layer architecture 210 is shown to have an application layer 212, an Internet protocol (IP) layer 214, a data link layer 216, and a physical layer 218. The application layer 212 includes device applications 220 that generate and initiate to communicate data (as data packets 222), and the application layer 212 includes the protocols used by the device applications 220 to provide user services and exchange of application data over the network connections established by the lower level protocols.

The IP layer 214 (also commonly referred to as "L3") of the general layer architecture 210 is representative of the data communication channels for the data packets and messages to and from the device applications 220 in the application layer 212, and generally provides for address and routing of network connections, host addressing and identification, and packet routing. Generally, aspects of the IP layer 214 implement message transfer services, and protocols in this layer provide error control, segmentation, flow control, and bandwidth congestion control. In this example, the IP layer 214 includes a network manager 224 that implements aspects of network association based on network performance capabilities, as described herein. The network manager 118 of the mobile device 100 shown and described with reference to FIG. 1 is an example of the network manager 224 in device 200.

The data link layer 216 (also commonly referred to as "L2") of the general layer architecture 210 generally provides for data transfer between network entity components, the transmission of internet layer data, protocols used to describe the local network topology, and the interfaces needed to effect transmission of Internet layer datagrams. In this example, the data link layer 216 includes various discovery engines, such as for Wi-Fi, Bluetooth and LE, cellular (wireless LTE), as well as a sensor HUB 226. The physical layer 218 (also commonly referred to as "L1") of the general layer architecture 210 includes the wireless radios 206 and the communication interfaces 208, as well as any other hardware electronic circuits of network communication technologies.

In aspects of network association based on network performance capabilities, the network manager 224 includes network monitoring components, such as a data network monitor 228 to monitor the network data parameters 230 and determine the network performance capabilities 232. The network manager 224 may be implemented to include independent processing, memory, and logic components as a computing and/or electronic device integrated with the device 200. Alternatively or in addition, the network manager 224 can be implemented as a software application or software module, such as computer-executable software instructions that are executable with a processor (e.g., with the processing system 202) of the device 200. As a software application, the network manager 224 can be stored on computer-readable storage memory (e.g., the device memory 204), such as any suitable memory device or electronic data storage implemented with the device.

Example methods 300 and 400 are described with reference to respective FIGS. 3 and 4 in accordance with implementations of network association based on network performance capabilities. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
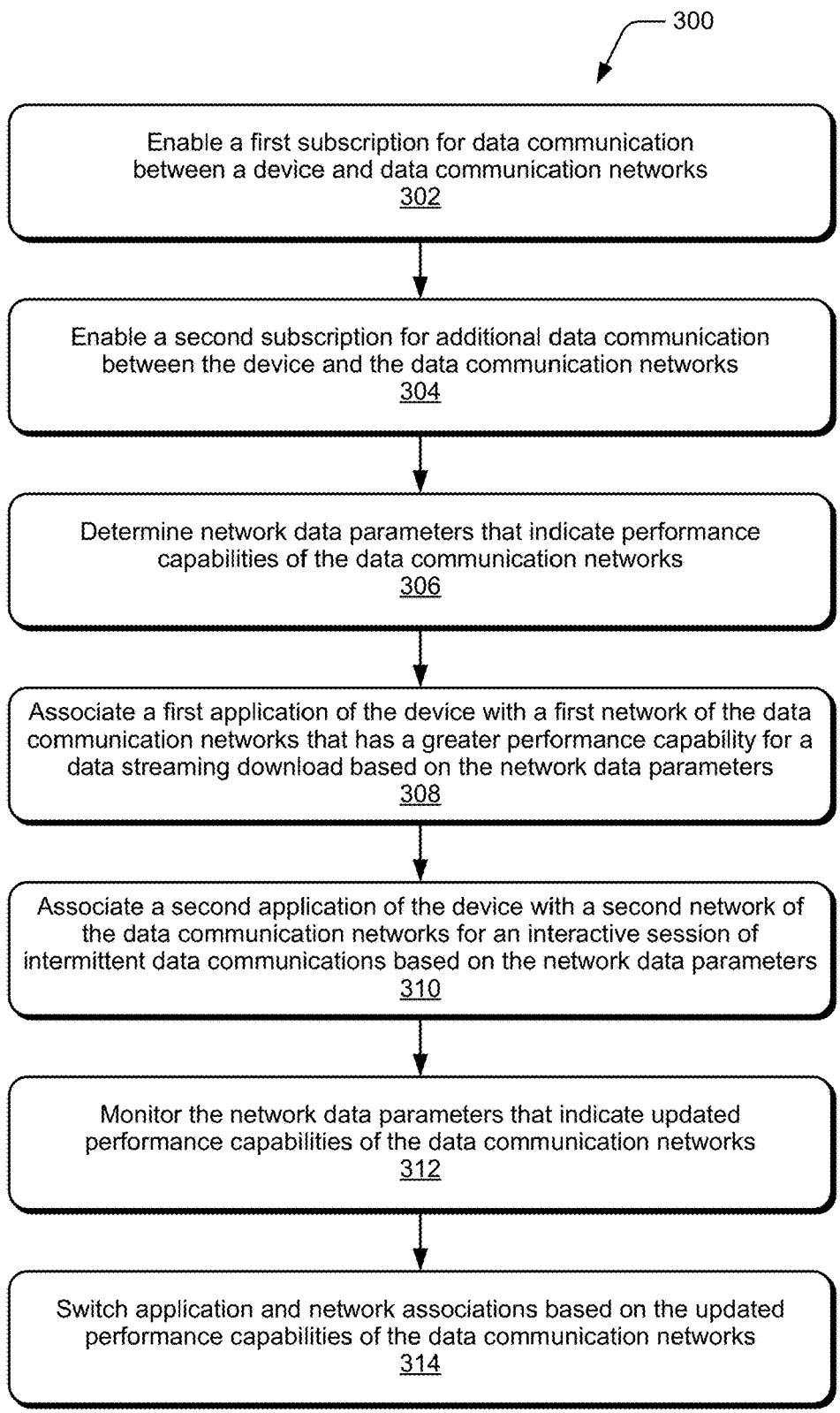
FIG. 3 illustrates an example method of network association based on network performance capabilities in a device in accordance with one or more implementations of the techniques described herein.

FIG. 3 illustrates example method(s) 300 of network association based on network performance capabilities and is generally described with reference to the network manager implemented in a dual-SIM device. The order in which the method is described is not intended to be construed as a limitation, and any number or combination of the described method operations can be performed in any order to perform a method, or an alternate method.

At 302, a first subscription is enabled for data communication between a device and data communication networks with a first subscriber identity module (SIM). For example, the mobile device 100 is a dual-SIM device that includes the first subscriber identity 110 (e.g., implemented as a SIM card or as an eSIM), which enables the first subscription 114 for data communication between the mobile device 100 and data communication networks associated with cellular network operator.

At 304, a second subscription is enabled for additional data communication between the device and the data communication networks with a second SIM. For example, the mobile device 100 also includes the second subscriber identity 112 (e.g., implemented as a SIM card or as an eSIM), which enables the second subscription for additional data communication between the mobile device 100 and the data communication networks.

In the dual-SIM device (e.g., mobile device 100), the first SIM (e.g., the first subscriber identity 110) and the second SIM (e.g., the second subscriber identity 112) can be implemented as either SIM cards that enable the respective first and second subscriptions 114, 116 with a wireless network operator of the data communication networks, or implemented as embedded SIMs that enable the respective first and second subscriptions 114, 116 with the wireless network operator of the data communication networks. In implementations, the mobile device 100 supports LTE on both of the first and second subscriptions 114, 116 and has Internet PDN (packet data network) established and active as part of LTE registration for wireless broadband communication. Notably, both of the subscriptions 114, 116 can be actively used for network data communications, and may be based on device application requirements for data exchange.

At 306, network data parameters that indicate performance capabilities of the data communication networks are determined. For example, the network manager 118 of the mobile device 100 determines the network data parameters 120 that indicate the network performance capabilities 122 of the data communication networks corresponding to the wireless network operator associated with the first and second subscriptions 114, 116. The network data parameters 120 that indicate the network performance capabilities 122 of the data communication networks include the available bandwidth 124, the data throughput 126 (e.g., network data speed), and the data connectivity 128 (e.g., network connection stability).

At 308, a first application of the device is associated with a first network of the data communication networks that has a greater performance capability for a data streaming download based on the network data parameters. For example, the network manager 118 of the mobile device 100 associates the first application 132 (of the device applications 130) with a first network of the data communication networks that has a greater performance capability for the data streaming download 134 based on the network data parameters 120. Generally, the data streaming download 134 for the first application 132 is data-intensive, such as video streaming for video playback on the mobile device 100, and the network manager 118 determines that the network data parameters 120 indicate the first network has more available bandwidth 124 for the data streaming download than a second one of the data communication networks.

At 310, a second application of the device is associated with a second network of the data communication networks for an interactive session of intermittent data communications based on the network data parameters. For example, the network manager 118 of the mobile device 100 also associates the second application 136 (of the device applications 130) with a second network of the data communication networks that is more reliable for the intermittent data communications 138 based on the network data parameters 120. Generally, the intermittent data communications 138 for the second application 136 may be for an interactive session that includes message exchanges intermittently communicated and received, and the network data parameters 120 indicate the second network has a more reliable data connectivity 128 for the message exchanges than the first network.

At 312, the network data parameters that indicate updated performance capabilities of the data communication networks are monitored. For example, the network manager 118 of the mobile device 100 monitors the network data parameters 120 for updated performance capabilities of the data communication networks corresponding to the wireless network operator.

At 314, application and network associations are switched based on the updated performance capabilities of the data communication networks. For example, the network manager 118 of the mobile device 100 switches the application and network associations in an event that the network performance capabilities 122 of the data communication networks change, as noted by monitoring the network data parameters 120. In an example implementation, the network manager 118 associates the first application 132 with the second network that now has more available bandwidth 124 for the data streaming download 134 than the first network based on a determination of updated network data parameters. Similarly, the network manager 118 associates the second application 136 with the first network that has a more reliable data connectivity 128 for the intermittent data communications 138 of the interactive session than the second network based on a determination of the updated network data parameters.

Figure 4:
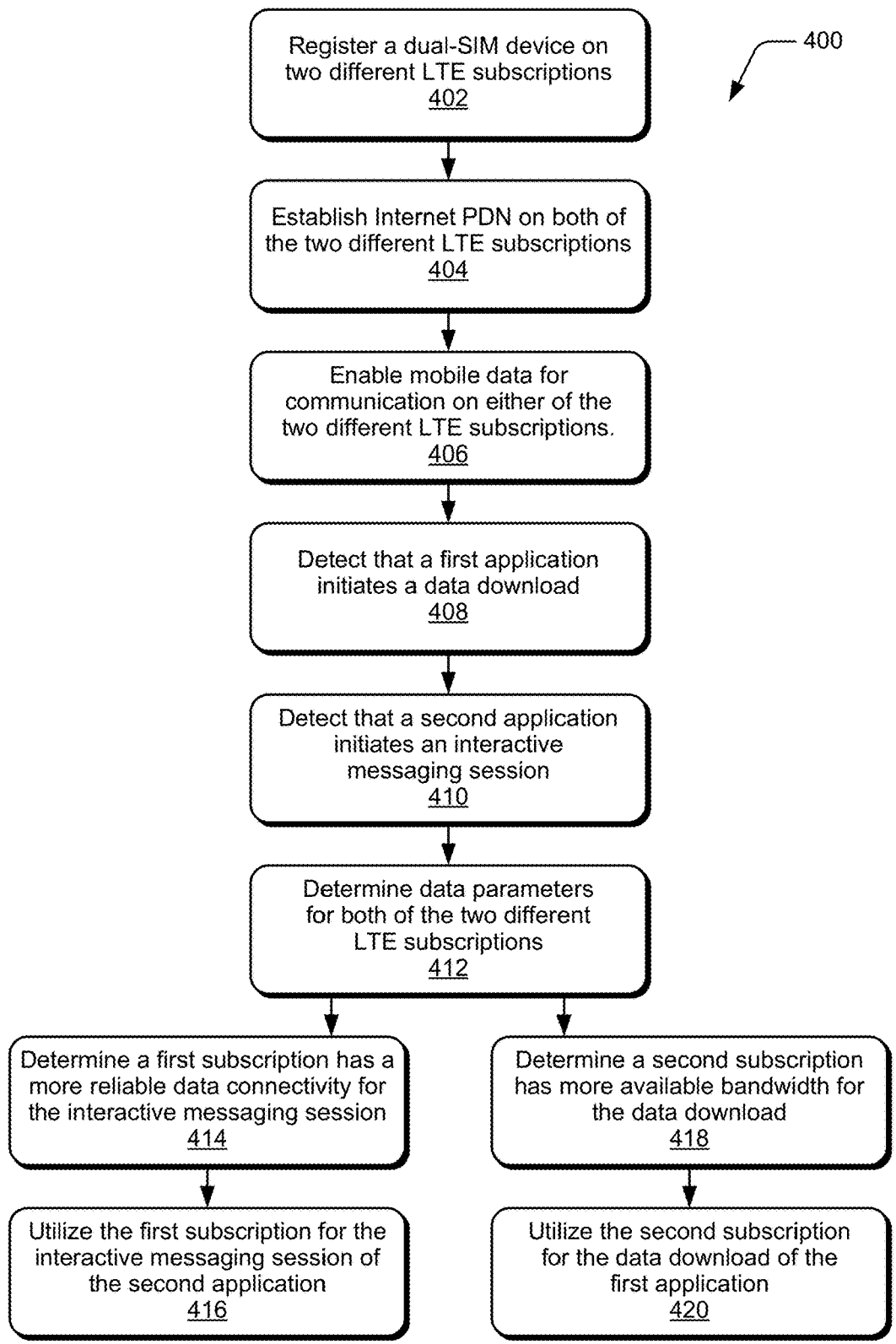
FIG. 4 illustrates an example method of network association based on network performance capabilities in a device, such as network association based on a network data parameters determination in accordance with one or more implementations of the techniques described herein.

FIG. 4 illustrates example method(s) 400 of network association based on network performance capabilities and is generally described with reference to the network manager implemented in a dual-SIM device, such as for network association based on a network data parameters determination. The order in which the method is described is not intended to be construed as a limitation, and any number or combination of the described method operations can be performed in any order to perform a method, or an alternate method.

At 402, a dual-SIM device is registered on two different LTE subscriptions. For example, the mobile device 100 is an example of a dual-SIM device that includes the first SIM (e.g., the first subscriber identity 110) and the second SIM (e.g., the second subscriber identity 112), each of which can be implemented as either SIM cards that enable the respective first and second subscriptions 114, 116 with the data communication networks, or implemented as embedded SIMs that enable the respective first and second subscriptions 114, 116 with the data communication networks.

At 404, Internet PDN is established on both of the two different LTE subscriptions and, at 406, mobile data is enabled for communication on either of the two different LTE subscriptions. For example, the Internet PDN (packet data network) is established and active as part of LTE registration for wireless broadband communication using the mobile device 100 that supports LTE on both of the first and second subscriptions 114, 116.

At 408, a first application is detected as having initiated a data download. For example, the network manager 118 of the mobile device 100 detects that the first application 132 initiates a data-intensive download, such as video streaming for video playback on the mobile device 100 in the form of the data streaming download 134.

At 410, a second application is detected as having initiated an interactive messaging session. For example, the network manager 118 of the mobile device 100 detects that the second application 136 initiates an interactive messaging session, such as an interactive session that includes message exchanges intermittently communicated and received in the form of the intermittent data communications 138.

At 412, data parameters for both of the two different LTE subscriptions are determined. For example, the network manager 118 of the mobile device 100 determines the network data parameters 120 for the two different LTE subscriptions (e.g., the first and second subscriptions 114, 116). The network data parameters 120 that indicate the network performance capabilities 122 include the available bandwidth 124, the data throughput 126 (e.g., network data speed), and the data connectivity 128 (e.g., network connection stability).

At 414, a first subscription is determined to have a more reliable data connectivity for the interactive messaging session, and at 416, the first subscription is utilized for the interactive messaging session of the second application. For example, the network manager 118 of the mobile device 100 determines that the data communication network associated with the first subscription 114 has a more reliable data connectivity 128 based on the network data parameters 120, and the first subscription 114 is then utilized for the interactive messaging session (e.g., the intermittent data communications 138) of the second application 136.

At 418, a second subscription is determined to have more available bandwidth for the data download, and at 420, the second subscription is utilized for the data download of the first application. For example, the network manager 118 of the mobile device 100 determines that the data communication network associated with the second subscription 116 has more available bandwidth 124 based on the network data parameters 120, and the second subscription 116 is then utilized for the data download (e.g., the data streaming download 134) of the first application 132.

Figure 5:
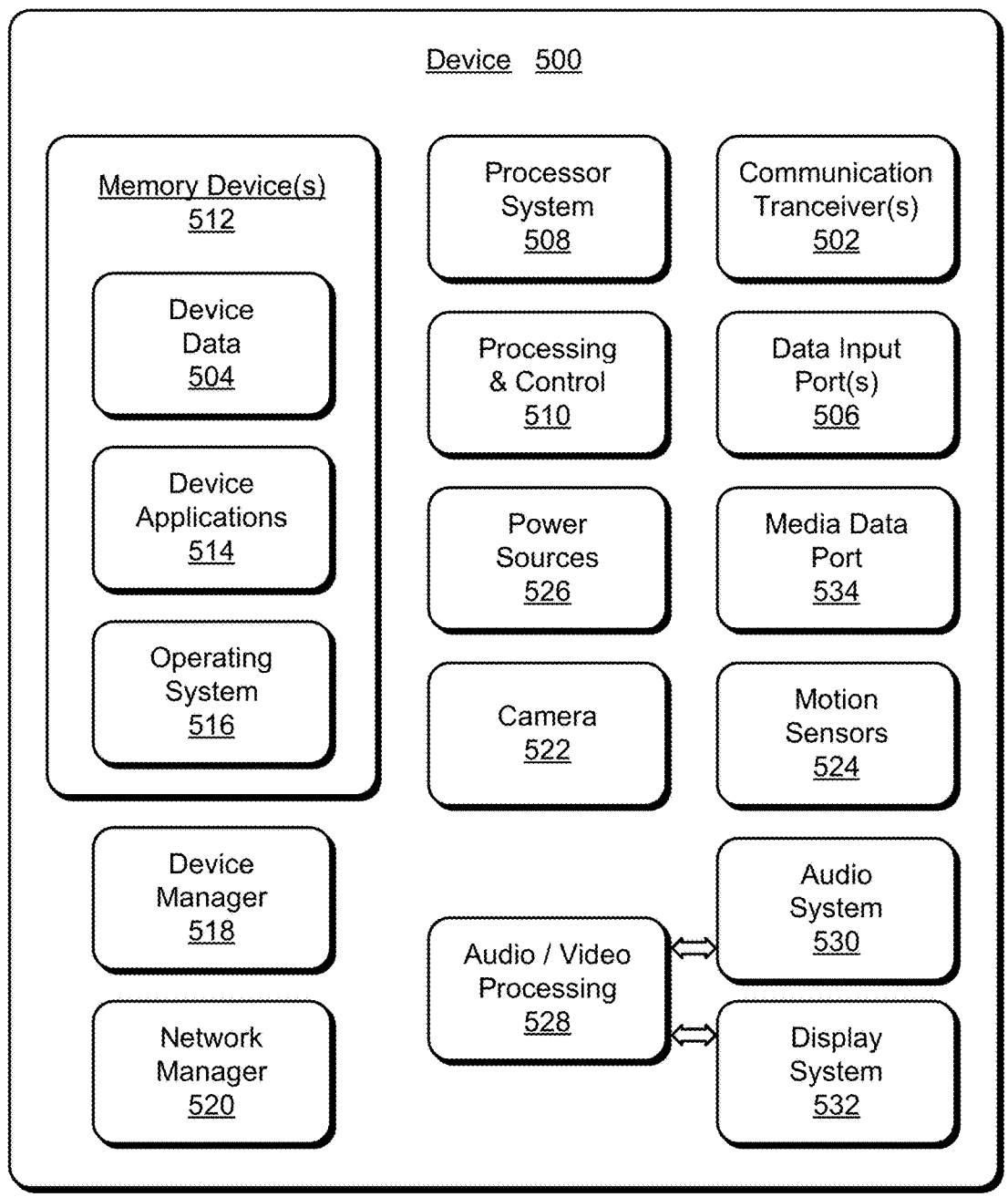
FIG. 5 illustrates various components of an example device that can implement aspects of network association based on network performance capabilities.

FIG. 5 illustrates various components of an example device 500, in which aspects of network association based on network performance capabilities can be implemented. The example device 500 can be implemented as any of the devices described with reference to the previous FIGS. 1-4, such as any type of a device, mobile device, collaborative device, access point, node device, IoT device, mobile phone, client device, wearable device, tablet, computing, communication, entertainment, gaming, media playback, and/or other type of electronic device. For example, the mobile device 100 and the device 200 shown and described with reference to respective FIGS. 1 and 2 may be implemented as the example device 500. Further a wearable device may include any one or combination of a watch, armband, wristband, bracelet, glove or pair of gloves, glasses, jewelry items, clothing items, any type of footwear or headwear, and/or other types of wearables.

The device 500 includes communication transceivers 502 that enable wired and/or wireless communication of device data 504 with other devices. The device data 504 can include any of the network manager generated and/or determined data. Additionally, the device data 504 can include any type of audio, video, and/or image data. Example communication transceivers 502 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processor system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 (e.g., memory devices) that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

The computer-readable storage memory 512 provides data storage mechanisms to store the device data 504, other types of information and/or data, and various device applications 514 (e.g., software applications). For example, an operating system 516 can be maintained as software instructions with a memory device and executed by the processor system 508. The device applications may also include a device manager 518, such as any form of a control application, software application, signal-processing and control module, code that is native to a particular device, a hardware abstraction layer for a particular device, and so on.

In this example, the device 500 includes a network manager 520 that implements aspects of network association based on network performance capabilities. The network manager 520 may be implemented with hardware components and/or in software as one of the device applications 514, such as when the device 500 is implemented as the mobile device 100 and/or as the device 200 described with reference to respective FIGS. 1 and 2. Examples of the network manager 520 include the network manager 118 that is implemented as a software application and/or as hardware components in the mobile device 100, and the network manager 224 that is implemented as a software application and/or as hardware components in the device 200. In implementations, the network manager 520 may include independent processing, memory, and logic components as a computing and/or electronic device integrated with the example device 500.

In this example, the device 500 also includes a camera 522 and motion sensors 524, such as may be implemented as components of an inertial measurement unit (IMU). The motion sensors 524 can be implemented with various sensors, such as a gyroscope, an accelerometer, and/or other types of motion sensors to sense motion of the device. The motion sensors 524 can generate sensor data vectors having three-dimensional parameters (e.g., rotational vectors in x, y, and z coordinates) indicating position, location, and/or orientation of the device. The device 500 can also include one or more power sources 526, such as when the device is implemented as a mobile device. The power sources may include a charging and/or power system, and can be implemented as a flexible strip battery, a rechargeable battery, a charged super-capacitor, and/or any other type of active or passive power source.

The device 500 can also include an audio and/or video processing system 528 that generates audio data for an audio system 530 and/or generates display data for a display system 532. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 534. In implementations, the audio system and/or the display system are integrated components of the example device. Alternatively, the audio system and/or the display system are external, peripheral components to the example device.

Although implementations of network association based on network performance capabilities have been described in language specific to features and/or methods, the subject of the appended claims is not necessarily limited to the specific features or methods described. Rather, the specific features and methods are disclosed as example implementations of network association based on network performance capabilities, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A device, comprising: a first subscriber identity module (SIM) to enable a first subscription for data communication between the device and data communication networks; a second SIM to enable a second subscription for additional data communication between the device and the data communication networks; a first application implemented for a data streaming download to the device; a second application implemented for an interactive session of intermittent data communications; a network manager implemented at least partially in hardware to: determine network data parameters that indicate performance capabilities of the data communication networks; associate the first application with a first network of the data communication networks that has a greater performance capability for the data streaming download based on the network data parameters; and associate the second application with a second network of the data communication networks for the interactive session of intermittent data communications based on the network data parameters.

Alternatively or in addition to the above described device, any one or combination of: the network data parameters that indicate performance capabilities of the data communication networks include available bandwidth, data throughput, and data connectivity. The data streaming download for the first application is data-intensive, and the network data parameters indicate the first network has more available bandwidth for the data streaming download than the second network. The interactive session for the second application utilizes the intermittent data communications, and the network data parameters indicate the second network has more reliable data connectivity for the interactive session than the first network. The data streaming download is video streaming for video playback on the device, and the network data parameters indicate the first network has more available bandwidth for the video streaming than the second network. The interactive session includes message exchanges that are intermittently communicated and received, and the network data parameters indicate the second network has more reliable connectivity for the message exchanges than the first network. The network manager is implemented to switch application and network associations based on updated network data parameters, and wherein: the first application is associated with the second network that has more available bandwidth for the data streaming download than the first network based on a determination of the updated network data parameters; and the second application is associated with the first network that has more reliable data connectivity for the interactive session than the second network based on the determination of the updated network data parameters. The network manager is implemented to: monitor the network data parameters that indicate updated performance capabilities of the data communication networks; and switch application and network associations based on the updated performance capabilities of the data communication networks. The first SIM and the second SIM are one of: SIM cards that enable the respective first and second subscriptions with a wireless network operator of the data communication networks; or embedded SIMs (eSIMs) that enable the respective first and second subscriptions with the wireless network operator of the data communication networks.

A method, comprising: enabling a first subscription for data communication between a device and data communication networks; enabling a second subscription for additional data communication between the device and the data communication networks; determining network data parameters that indicate performance capabilities of the data communication networks; associating a first application of the device with a first network of the data communication networks that has a greater performance capability for a data streaming download based on the network data parameters; and associating a second application of the device with a second network of the data communication networks for an interactive session of intermittent data communications based on the network data parameters.

Alternatively or in addition to the above described method, any one or combination of: the network data parameters that indicate performance capabilities of the data communication networks include available bandwidth, data throughput, and data connectivity. The data streaming download for the first application is data-intensive, and the network data parameters indicate the first network has more available bandwidth for the data streaming download than the second network. The interactive session for the second application utilizes the intermittent data communications, and the network data parameters indicate the second network has more reliable data connectivity for the interactive session than the first network. The data streaming download is video streaming for video playback on the device, and the network data parameters indicate the first network has more available bandwidth for the video streaming than the second network. The interactive session includes message exchanges that are intermittently communicated and received, and the network data parameters indicate the second network has more reliable connectivity for the message exchanges than the first network. The method includes monitoring the network data parameters that indicate updated performance capabilities of the data communication networks; and switching application and network associations based on the updated performance capabilities of the data communication networks. The method includes switching application and network associations based on updated network data parameters; associating the first application with the second network that has more available bandwidth for the data streaming download than the first network based on a determination of the updated network data parameters; and associating the second application with the first network that has more reliable data connectivity for the interactive session than the second network based on the determination of the updated network data parameters. A first subscriber identity module (SIM) implemented in the device enables the first subscription for the data communication between the device and data communication networks; and a second SIM implemented in the device enables the second subscription for the additional data communication between the device and the data communication networks. The first SIM and the second SIM are one of: SIM cards that enable the respective first and second subscriptions with a wireless network operator of the data communication networks; or embedded SIMs (eSIMs) that enable the respective first and second subscriptions with the wireless network operator of the data communication networks.

A dual-SIM device, comprising: a first subscriber identity module (SIM) enabling data communication via data communication networks of a wireless network operator; a second SIM enabling the data communications via the data communication networks; a network manager implemented at least partially in hardware to: monitor network data parameters that indicate performance capabilities of the data communication networks; associate a first application with a first network of the data communication networks that has a greater performance capability for a data streaming download based on the network data parameters; and associate a second application with a second network of the data communication networks that has a greater performance capability for intermittent data communications of an interactive session based on the network data parameters.

The invention claimed is:
1. A device, comprising:
a first subscriber identity module (SIM) to enable a first subscription for data communication between the device and data communication networks;
a second SIM to enable a second subscription for additional data communication between the device and the data communication networks;
a first application implemented for a data streaming download to the device;
a second application implemented for an interactive session of intermittent data communications;
a network manager implemented at least partially in hardware to:

determine network data parameters that indicate performance capabilities of the data communication networks;

associate the first application with a first network of the data communication networks that has a greater performance capability for the data streaming download based on the network data parameters; and associate the second application with a second network of the data communication networks for the interactive session of intermittent data communications based on the network data parameters.

2. The device as recited in claim 1, wherein the network data parameters that indicate performance capabilities of the data communication networks include available bandwidth, data throughput, and data connectivity.

3. The device as recited in claim 1, wherein the data streaming download for the first application is data-intensive, and the network data parameters indicate the first network has more available bandwidth for the data streaming download than the second network.

4. The device as recited in claim 1, wherein the interactive session for the second application utilizes the intermittent data communications, and the network data parameters indicate the second network has more reliable data connectivity for the interactive session than the first network.

5. The device as recited in claim 1, wherein the data streaming download is video streaming for video playback on the device, and the network data parameters indicate the first network has more available bandwidth for the video streaming than the second network.

6. The device as recited in claim 1, wherein the interactive session includes message exchanges that are intermittently communicated and received, and the network data parameters indicate the second network has more reliable connectivity for the message exchanges than the first network.

7. The device as recited in claim 1, wherein the network manager is implemented to switch application and network associations based on updated network data parameters, and wherein:

the first application is associated with the second network that has more available bandwidth for the data streaming download than the first network based on a determination of the updated network data parameters; and the second application is associated with the first network that has more reliable data connectivity for the interactive session than the second network based on the determination of the updated network data parameters.

8. The device as recited in claim 1, wherein the network manager is implemented to:

monitor the network data parameters that indicate updated performance capabilities of the data communication networks; and switch application and network associations based on the updated performance capabilities of the data communication networks.

9. The device as recited in claim 1, wherein the first SIM and the second SIM are one of:

SIM cards that enable the respective first and second subscriptions with a wireless network operator of the data communication networks; or embedded SIMs (eSIMs) that enable the respective first and second subscriptions with the wireless network operator of the data communication networks.

10. A method, comprising:

enabling a first subscription for data communication between a device and data communication networks;

enabling a second subscription for additional data communication between the device and the data communication networks;

determining network data parameters that indicate performance capabilities of the data communication networks;

associating a first application of the device with a first network of the data communication networks that has a greater performance capability for a data streaming download based on the network data parameters; and associating a second application of the device with a second network of the data communication networks for an interactive session of intermittent data communications based on the network data parameters.

11. The method as recited in claim 10, wherein the network data parameters that indicate performance capabilities of the data communication networks include available bandwidth, data throughput, and data connectivity.

12. The method as recited in claim 10, wherein the data streaming download for the first application is data-intensive, and the network data parameters indicate the first network has more available bandwidth for the data streaming download than the second network.

13. The method as recited in claim 10, wherein the interactive session for the second application utilizes the intermittent data communications, and the network data parameters indicate the second network has more reliable data connectivity for the interactive session than the first network.

14. The method as recited in claim 10, wherein the data streaming download is video streaming for video playback on the device, and the network data parameters indicate the first network has more available bandwidth for the video streaming than the second network.

15. The method as recited in claim 10, wherein the interactive session includes message exchanges that are intermittently communicated and received, and the network data parameters indicate the second network has more reliable connectivity for the message exchanges than the first network.

16. The method as recited in claim 10, further comprising:

monitoring the network data parameters that indicate updated performance capabilities of the data communication networks; and switching application and network associations based on the updated performance capabilities of the data communication networks.

17. The method as recited in claim 10, further comprising:

switching application and network associations based on updated network data parameters;

associating the first application with the second network that has more available bandwidth for the data streaming download than the first network based on a determination of the updated network data parameters; and associating the second application with the first network that has more reliable data connectivity for the interactive session than the second network based on the determination of the updated network data parameters.

18. The method as recited in claim 10, wherein:

a first subscriber identity module (SIM) implemented in the device enables the first subscription for the data communication between the device and data communication networks; and a second SIM implemented in the device enables the second subscription for the additional data communication between the device and the data communication networks.

19. The method as recited in claim 18, wherein the first SIM and the second SIM are one of:
  SIM cards that enable the respective first and second subscriptions with a wireless network operator of the data communication networks; or
  embedded SIMs (eSIMs) that enable the respective first and second subscriptions with the wireless network operator of the data communication networks.

20. A dual-SIM device, comprising:
  a first subscriber identity module (SIM) enabling data communication via data communication networks of a wireless network operator;
  a second SIM enabling the data communications via the data communication networks;
  a network manager implemented at least partially in hardware to:
    monitor network data parameters that indicate performance capabilities of the data communication networks;
    associate a first application with a first network of the data communication networks that has a greater performance capability for a data streaming download based on the network data parameters; and
    associate a second application with a second network of the data communication networks that has a greater performance capability for intermittent data communications of an interactive session based on the network data parameters.

* * * * *